Patented June 21, 1949

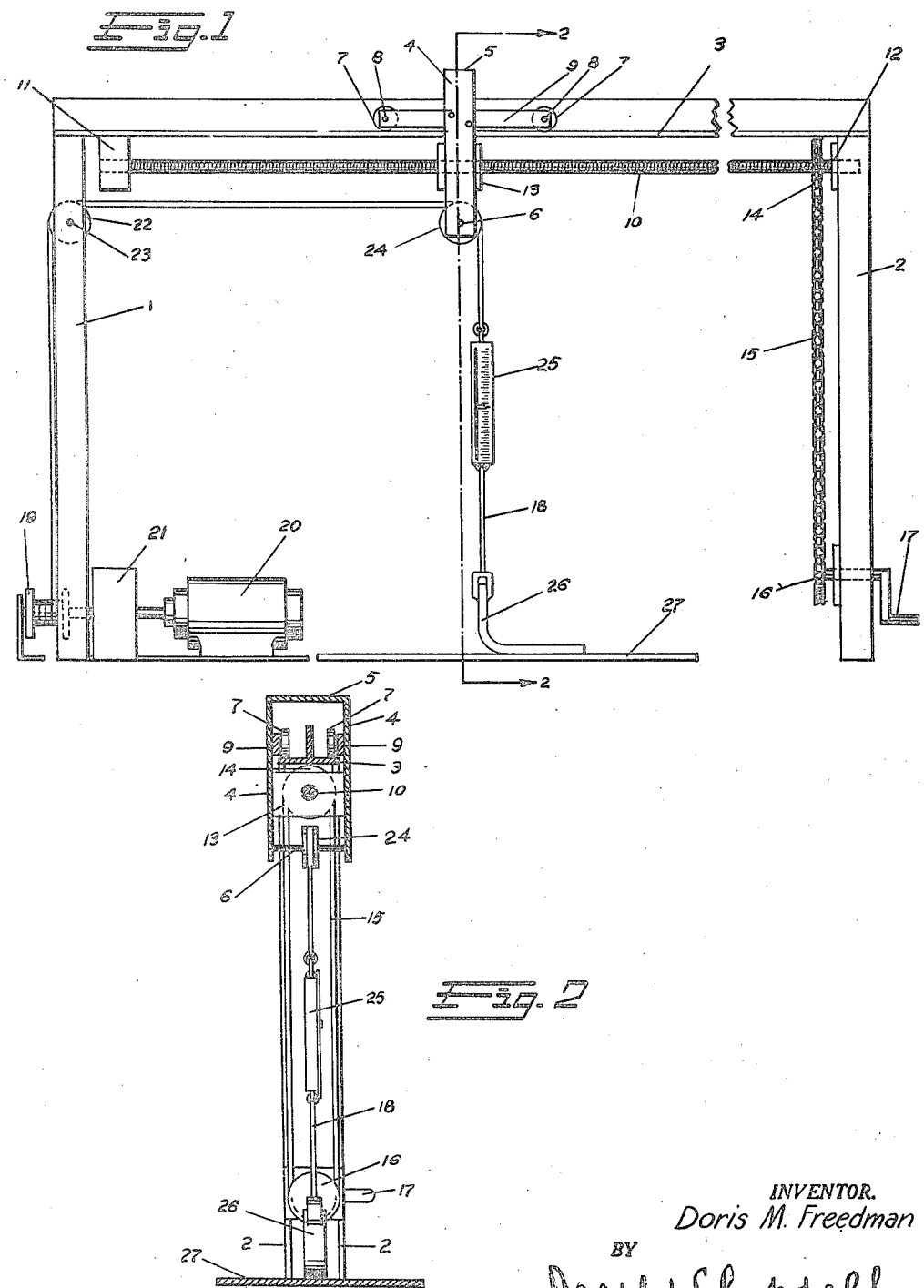

2,473,517

UNITED STATES PATENT OFFICE 2,473,517

ADHESION TESTING MACHINE

Doris M. Freedman, New York, N. Y.

Application August 6, 1945, Serial No. 609,295

10 Claims. (Cl. 73—150)

(Granted under the act of March 3, 1883, as amended April 30, 1928; 370 O. G. 757)

This invention relates to a testing machine and more particularly to a strip-adhesion testing machine for ascertaining the strength of different adhesives.

The strength of an adhesive is determined by securing a test strip to a rigid plate adhesively and then stripping the specimen from the plate while noting the force required to accomplish this. In the dead-weight method of loading used commonly in such tests, the plate is suspended in a horizontal plane with the test strip on the lower side thereof. A device is attached to one end of the test strip and dead weight is added thereto until the strip is pulled from the plate.

Certain disadvantages are inherent in that method. It is difficult to strip at the uniform rate that is necessary in certain tests. If there are weak spots in the adhesive, as is often the case, the test strip can be torn off too rapidly for an accurate evaluation of the load required. Also, it is not possible to use different adhesives on sections of the same test strips to secure comparative readings from a single test.

With the testing machine of the present invention, the test strip is pulled from the plate at a uniform rate and a pull- or tension-indicating device such as a spring balance indicates the force used throughout the stripping. Moreover, the spring balance compensates for any weak spot in the adhesive by decreasing the load when such weak spots are encountered in the stripping.

An object of the present invention is to provide a machine that will test accurately the strength of adhesives by indicating the force required to pull a test strip from a plate.

A further object is to provide such a testing machine that will strip a test strip from the plate at a predetermined uniform rate.

Another object is to provide a machine of the above mentioned type that will indicate at all times the amount of force being exerted and will compensate for weak spots in the adhesive by reducing the pull on the test strip when weak spots are encountered.

Further objects and advantages of this invention as well as its construction, arrangement and operation, will be apparent from the following description and claims in connection with the accompanying drawing, in which Fig. 1 is a side elevational view of a testing machine embodying the present invention; and Fig. 2 is a vertical cross sectional view of the machine taken along the line 2—2 of Figure 1.

There is shown in the drawing a frame comprising two pair of legs 1 and 2 supporting a horizontal table portion 3. Each pair of legs is preferably formed of metal strips or bars facing each other, and the horizontal table portion 3 is preferably an inverted T-beam. The T-beam 3 may be connected to the legs 1 and 2 by welding or any other suitable means.

A traveling carriage rides back and forth on the T-beam 3. While different types of carriages can be employed, that shown in the drawing comprises side members 4 joined together at their upper ends by a cross piece 5 and adjacent the opposite ends by a shaft 6. The sides of the carriage extend vertically on opposite sides of the T-beam 3 with the top cross piece 5 above and the shaft 6 a distance below said beam. To enable the carriage to move back and forth, it is mounted on wheels 7 that run on the upper surface of the T-beam 3. The wheels 7 rotate on stud shafts 8 extending from the horizontal supporting members 9, which in turn are connected fixedly to the sides 4 of the carriage frame. It has been found that two wheels on each of the supporting members 9 will suffice.

A lead screw 10 is employed to move the traveling carriage back and forth on the top of the T-beam 3. One end of the lead screw 10 is journalled in a bearing 11 attached to the underside of the T-beam 3 adjacent one end of the device, and the other end is journalled in a bearing 12 extending between the legs at the opposite end of the device. The carriage is provided with a cross member 13 that engages the lead screw 10 so that rotation of the lead screw in opposite directions causes the carriage to move back and forth at a speed depending upon the speed of rotation of the lead screw. The lead screw 10 can be rotated by a sprocket 14 thereon and a sprocket chain 15 driven by a second sprocket 16 mounted adjacent the lower end of legs 3 and having a handle 17 connected thereto. With this construction the rate of travel of the carriage can be varied as desired and controlled carefully. However, other suitable means for rotating the lead screw can be provided.

The means for exerting the required pull on the test strip comprise a line 18 having one end connected to the test strip and the other end secured to a drum or winch 19 driven by a constant-speed motor 20 through a gear reducer 21. The speed of the drum or winch 19 depends upon the speed of the motor and upon the relative size of the gears in the gear reducer 21. Motor 20 and gear reducer 21 are preferably positioned adjacent the legs 1. The line 18 runs substantially vertically from the drum 19 to a pulley 22 mounted on a shaft 23 between legs 1, then horizontally to another pulley 24 mounted on shaft 6, from where it depends to the test strip.

A resilient tension-indicating means, such as a spring balance 25, is provided in the line 18, preferably between pulley 24 and the test strip.

In operation a test strip 26 is secured adhesively to a plate 27. Said plate is secured by any suitable means to the floor or bench on which the legs 1 and 2 rest or it can be of a size sufficient to permit the legs 1 and 2 to rest thereon. The plate 27 and the carriage are so positioned that at the beginning of the test the test strip 26 lies generally parallel to the T-beam 3 and line 18 is substantially vertical so that the pull is perpendicular to the plate 27. With the end of the line 18 connected to the end of the test strip 26, motor 20 is started, which causes the test strip to be pulled from the plate at a uniform speed. At the same time, handle 17 is turned to rotate the lead screw 10 and thus move the carriage to maintain the pull on the strip 26 continuously in a direction perpendicular to the plate. Throughout the test the amount of pull required to pull the test strip 26 from the plate 27 is indicated by spring balance 25. If any weak spots in the adhesive are encountered, the spring balance acts to reduce the pull momentarily and thereby prevent the strip from being pulled off too rapidly. As force is exerted on the test strip both by movement of the carriage in a direction to increase the distance between pulleys 22 and 24 as well as by the speed of rotation of the drum 19, these are adjusted so that the stripping of the test strip 26 from the plate 27 will proceed at the rate desired.

Various modifications and changes can be made in the above device without departing from the scope thereof as set forth in the claims.

The invention described herein may be manufactured and used by or for the Government of the United States of America for governmental purposes without the payment of any royalties thereon or therefor.

I claim:

1. A device of the class described comprising a frame, a line supported by said frame and having one end connected to a test strip secured adhesively to a plate, means for taking up on said line at a uniform rate to pull said strip from such plate, guide means for controlling the direction of pull of said line on said strip, movable means for maintaining the pull on said strip substantially perpendicular to such plate, and tension-indicating means in said line for registering the force exerted on said strip.

2. A device of the class described comprising a frame, a carriage mounted on said frame for reciprocating movement, a line depending from said carriage and having one end connected to a test strip secured adhesively to a plate, means for taking up on said line to pull said strip from such plate, means for moving said carriage to maintain the pull on said strip substantially perpendicular to such plate, and tension-indicating means in said line for registering the force exerted on said strip.

3. A device of the class described comprising a frame, a carriage mounted on said frame for reciprocating movement, a line depending from said carriage and having one end connected to a test strip secured adhesively to a plate, motor driven means for taking up on said line to pull said strip from such plate, means for moving said carriage to maintain the pull on said strip substantially perpendicular to such plate, and resilient tension-indicating means in said line for continuously registering the force exerted on said strip.

4. A device of the class described comprising a frame, a carriage mounted on said frame for reciprocating movement, a line depending from said carriage and having one end connected to a test strip secured adhesively to a plate, motor-driven means for taking up on said line at a uniform rate to pull said strip from such plate, a lead screw carried by said frame and operatively connected to said carriage for moving said carriage to maintain the pull on said strip substantially perpendicular to such plate, and a spring balance in said line for registering continuously the force exerted on said strip.

5. A device of the class described comprising a frame, a carriage mounted on said frame for reciprocating movement, a line having one end connected to a test strip secured adhesively to a plate, motor driven means connected to said frame for taking up on said line to pull said strip from such plate, guide means carried by said carriage said line running from said motor-driven means through said guide means carried by said carriage, manually controlled means for moving said carriage to maintain the pull on said strip substantially perpendicular to such plate, and resilient tension-indicating means in said line between the free end thereof and said carriage for registering continuously the force exerted on said strip.

6. A device of the class described comprising a line having one end adapted to be connected to a test strip secured adhesively to a plate, means for taking up on said line at a uniform rate whereby said line exerts a force on the strip and thereby strips the strip from such plate, means for maintaining said force at a substantially constant angle with respect to such plate while the strip is being stripped from such plate, and force-indicating means for registering said force.

7. A device of the class described comprising a line having one end adapted to be connected to a test strip secured adhesively to a plate, means for taking up on said line whereby said line exerts a force on the strip and thereby strips the strip from such plate, means movable simultaneously with the operation of said line-taking-up means and adapted for moving at least a portion of said line at an angle to the longitudinal direction of said line whereby the force exerted by said line on the strip is exerted continuously in a predetermined direction, and force-indicating means for registering said force.

8. An adhesion-testing device comprising a table, a carriage mounted slidably on said table, a pulley carried on said carriage, means to slide said carriage along said table, a winch, a motor driving said winch, a line carried by said winch, said line depending from said pulley, and means to secure an object to the end of said line.

9. An adhesion-testing device comprising a table, a carriage mounted slidably on said table, a pulley carried on said carriage, means to slide said carriage along said table, a winch, a motor, a gear reducer driving said winch, a line carried by said winch, said line depending from said pulley, means to secure an object to the end of said line, and means to indicate the tension in a selected portion of said line.

10. An adhesion-testing device comprising an inverted T-beam table carried horizontally upon legs, a lead screw journalled in bearings proximate the ends of said table, a wheeled carriage mounted slidably on said table, said carriage including a cross member adapted to be fed along said table by said lead screw, remote means to rotate said lead screw, a constant-speed motor, a winch, and a gear reducer, said motor driving said winch through said gear reducer, said winch being mounted adjacent one of said legs, a line carried on the drum of said winch, a spring balance secured to the end of said line, a first pulley mounted on one of said legs proximate said table, a second pulley on said carriage, said line extending substantially vertically from said winch, over said first pulley, then extending horizontally and then over said second pulley and then extending vertically to one end of said spring balance, and means to secure the other end of said balance to a strip to be tested.

DORIS M. FREEDMAN.

REFERENCES CITED

The following references are of record in the file of this patent:

UNITED STATES PATENTS

| Number | Name | Date |
|---|---|---|
| 1,672,077 | Robin | June 5, 1928 |
| 1,991,854 | Johansson | Feb. 19, 1935 |
| 2,051,464 | Bradner et al. | Aug. 18, 1936 |